(12) United States Patent
Drenning

(10) Patent No.: US 12,043,147 B1
(45) Date of Patent: Jul. 23, 2024

(54) MOTORIZED GROCERY SCOOTER WITH SEAT LIFTING MECHANISM

(71) Applicant: Rodney Drenning, Fort Myers, FL (US)

(72) Inventor: Rodney Drenning, Fort Myers, FL (US)

( * ) Notice: Subject to any disclaimer, the term of this patent is extended or adjusted under 35 U.S.C. 154(b) by 350 days.

(21) Appl. No.: 17/571,732

(22) Filed: Jan. 10, 2022

(51) Int. Cl.
*B60N 2/16* (2006.01)

(52) U.S. Cl.
CPC ..................... *B60N 2/16* (2013.01)

(58) Field of Classification Search
CPC ....................................................... B60N 2/16
USPC ................... 296/65.06; 180/65.1, 65.51, 22
See application file for complete search history.

(56) References Cited

U.S. PATENT DOCUMENTS

| | | | |
|---|---|---|---|
| 3,493,245 A | | 2/1970 | Nabinger |
| 3,580,349 A * | | 5/1971 | Brennan ................ B62K 5/025 |
| | | | 280/278 |
| 4,452,327 A * | | 6/1984 | Mowat ................ A61G 5/1018 |
| | | | 188/29 |
| 4,570,739 A * | | 2/1986 | Kramer .................. B62K 5/025 |
| | | | 280/DIG. 5 |
| 4,771,840 A * | | 9/1988 | Keller ................... B62B 5/0026 |
| | | | 280/DIG. 4 |
| 5,020,624 A * | | 6/1991 | Nesterick ............... B62K 5/025 |
| | | | 280/282 |
| 8,066,301 B1 * | | 11/2011 | Westermann ............ A61G 5/00 |
| | | | 280/47.38 |
| 10,099,579 B2 * | | 10/2018 | Kates ........................ B60N 2/24 |
| 11,648,972 B2 * | | 5/2023 | Mallette ................. B62K 11/10 |
| | | | 180/14.1 |
| 2013/0333961 A1 * | | 12/2013 | O'Donnell ............ B62B 5/0033 |
| | | | 180/65.1 |

FOREIGN PATENT DOCUMENTS

WO     WO-2015059662 A1 *  4/2015   ............... A61G 5/04

\* cited by examiner

*Primary Examiner* — Pinel E Romain
(74) *Attorney, Agent, or Firm* — Sanchelima & Associates, P.A.; Christian Sanchelima; Jesus Sanchelima

(57) ABSTRACT

A motorized grocery store scooter with seat lifting mechanism including a motorized cart assembly, a seat assembly, and a fastening assembly is disclosed herein. The motorized cart assembly includes a motorized grocery cart. The seat assembly includes a seat that can be lifted using a telescopic arm and a lifting mechanism. The seat assembly further includes an activation button. The seat assembly is configured to receive a user and provide means for reaching items that are out of reach in a regular motorized scooter. The seat can be lifted up to 24 inches from its normal position. A fastener assembly is also included having a seat harness configured to secure the user and thus, avoid risks when the seat is raised or lowered.

12 Claims, 5 Drawing Sheets

MOTORIZED GROCERY SCOOTER WITH SEAT LIFTING MECHANISM

BACKGROUND OF THE INVENTION

1. Field of the Invention

The present invention relates to a motorized grocery store scooter with seat lifting mechanism and, more particularly, to a motorized grocery store scooter with seat lifting mechanism that includes a seat lifting mechanism for reaching items on elevated shelves.

2. Description of the Related Art

Several designs for motorized grocery store scooter with seat lifting mechanism have been designed in the past. None of them, however, include a seat lifting mechanism capable of lifting a user a maximum of 24 inches above the normal sitting position.

Applicant believes that a related reference corresponds to U.S. Pat. No. 3,580,349 issued for a portable motorized cart with a seat. Applicant believes that another related reference corresponds to U.S. Pat. No. 3,493,245 issued for a manually propelled cart with a seat lifting mechanism. None of these references, however, teach of a motorized grocery store scooter with seat lifting mechanism that is comprised of a motorized mobility cart with a grocery basket and a seat lifting mechanism that allows a sitting individual to reach items on elevated shelves.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a motorized grocery store scooter with seat lifting mechanism that can raise up and allow an individual to reach upper shelves.

It is another object of this invention to provide a motorized grocery store scooter with seat lifting mechanism that permits users to reach articles without the assistance of others.

It is still another object of the present invention to provide a motorized grocery store scooter with seat lifting mechanism that is easy to operate.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
FIG. 1 represents an operational view of the present invention 10 wherein a user is reaching items of an upper shelf by means of the seat member 42 being extended by the lifting mechanism 46.
Figure 2:
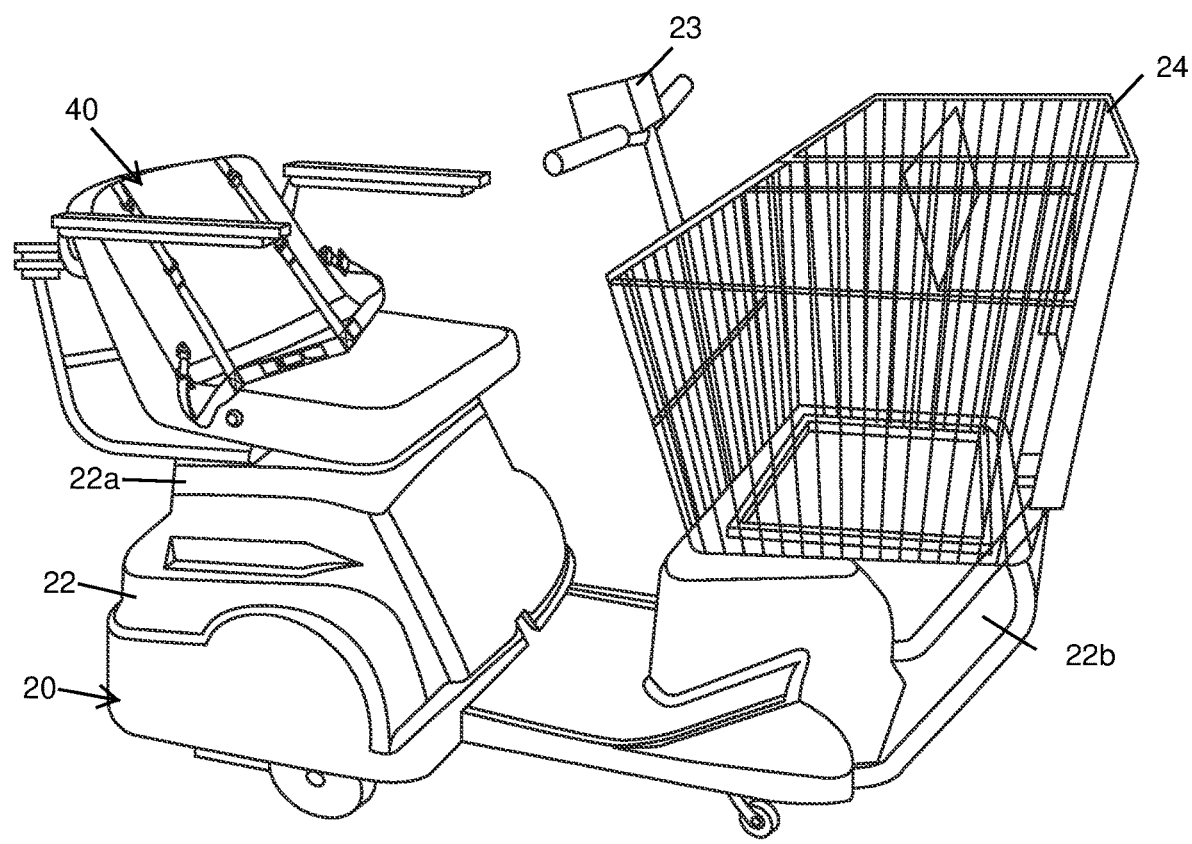
FIG. 2 shows an isometric view of the motorized cart assembly 22 having a motorized grocery cart 22 with a steering wheel 23 and a grocery basket 24.
Figure 3:
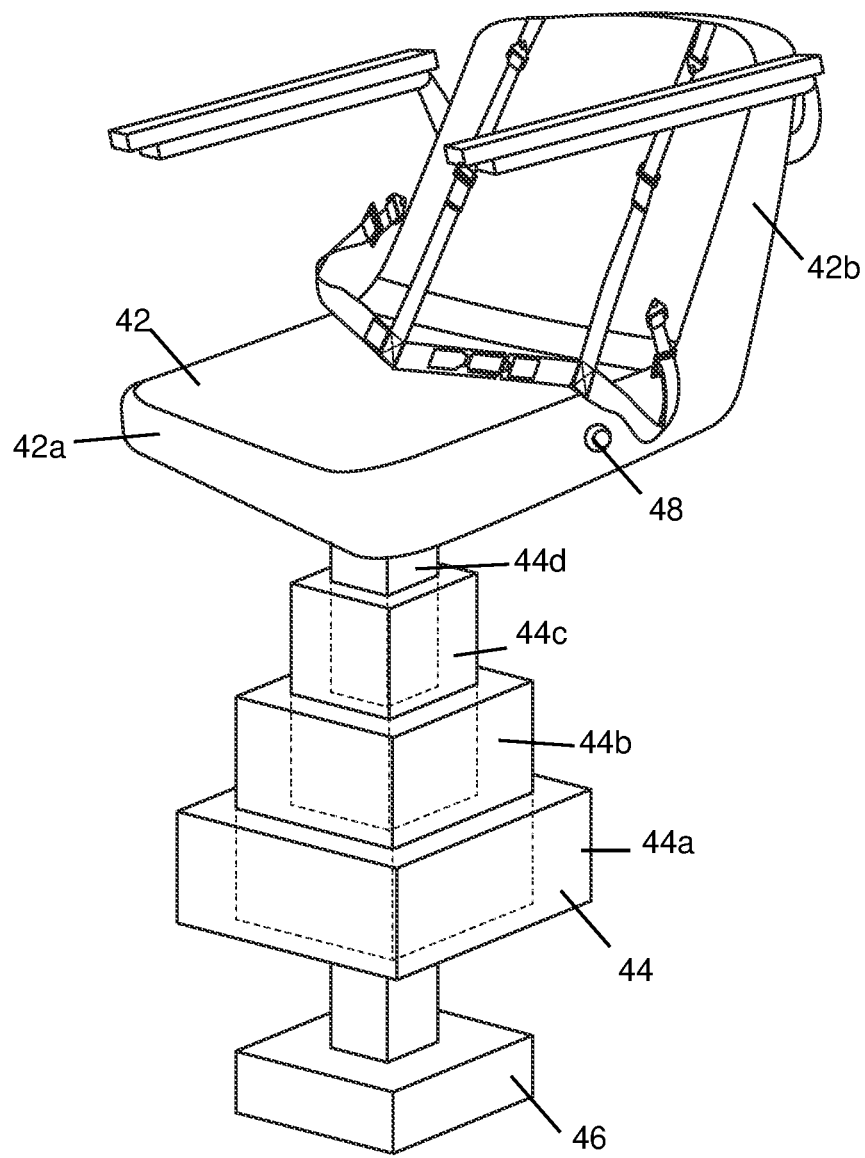
FIG. 3 illustrates an isometric view of the seat assembly 40 wherein the telescopic arm 44 is extended. The seat member 42 is mounted on top of the telescopic arm 44.
Figure 4:
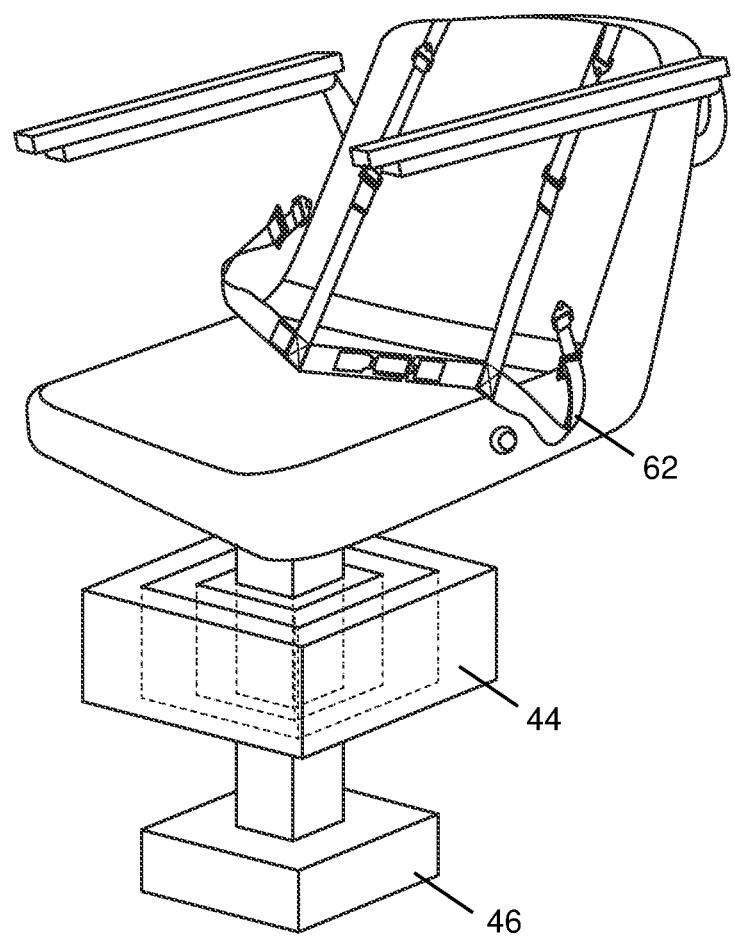
FIG. 4 is a representation of an internal isometric view of the telescopic arm 44 in a contracted configuration.
Figure 5:
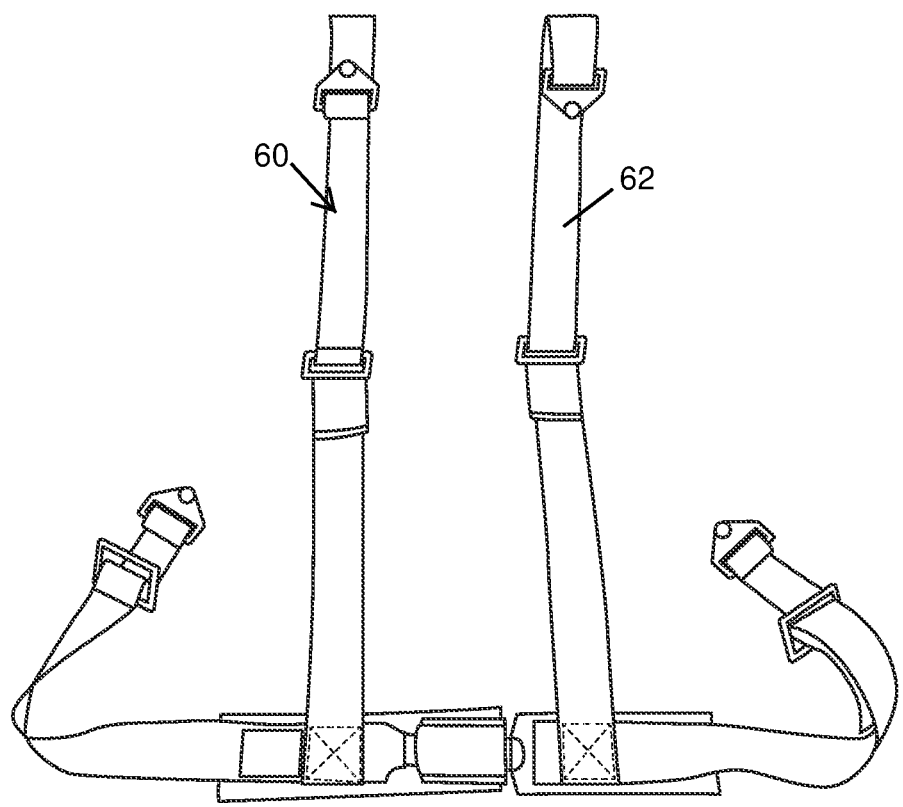
FIG. 5 is an isometric view of the fastener assembly 60 having a seat fastener 62. The seat fastener 62 is configured to secure a user while using the present invention 10.

Referring now to the drawings, where the present invention is generally referred to with numeral 10, it can be observed that it basically includes a motorized cart assembly 20, a seat assembly 40, and a fastener assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The motorized cart assembly 20 includes a motorized grocery cart 22, and grocery basket 24. Said motorized grocery cart 22 is a shopping cart equipped with an electric motor and navigational controls. Motorized grocery cart 22 is powered by an electric motor. Motorized grocery cart 22 may be made of a combination of material such as plastic, metal, wood, cloth, or any variation thereof. Motorized grocery cart 22 may be a two-wheeled motorized scooter, a three-wheeled motorized scooter, a four-wheeled motorized scooter, or any variation thereof. The motorized grocery cart 22 further includes a steering wheel 23. Said steering wheel 23 is used to manually steer the motorized grocery cart 22 to a desire direction. Said steering wheel 23 may have a circular shape, a rectangular shape, a rectangular shape with rounded edges, a tubular shape, or any variation thereof. The steering wheel 23 may be made of plastic, metal, wood, or any variation thereof. The motorized grocery cart 22 further includes a seat base 22*a* and a front portion 22*b*. The seat base 22*a* is configured to receive a seat thereon. Seat base 22*a* may have a rectangular shape, a circular shape, a triangular shape, an irregular shape, or any variation thereof. Seat base 22*a* may be made of the same material as the motorized grocery cart 22. In a suitable embodiment the grocery basket 24 may be mounted onto said front portion 22*b*. Said grocery basket 24 is configured to provide users means for carrying around items. Grocery basket 24 may be made of plastic, metal, wire, cloth, or any variation thereof. Grocery basket 24 is volumetric. Grocery basket 24 may be volumetrically suitable for nesting several items in it. Grocery basket 24 includes a cavity 24*a* configured to receive articles therein.

The seat assembly 40 includes a seat member 42, a telescopic arm 44, a lifting mechanism 46, and an activation button 48. The seat member 42 may be made of a durable, and sturdy material. The seat member 42 may be made of nylon, acrylic, PVC, polythene, polypropylene, Bakelite, epoxy resin, melamine, wood, metal, stainless steel, or any variation thereof. Said seat member 42 may be volumetrically suitable for receiving a user. The seat member 42 may be ergonomic. Seat member 42 may be located on the seat base 22a. The seat member further includes a base portion 42a and a back portion 42b.

The telescopic arm 44 may be made of a sturdy. In a suitable embodiment said telescopic arm 44 may be made of steel, metal, or the like. The telescopic arm 44 permits the movement of one part sliding from another for lengthening an object from a rest state. The telescopic arm further includes a first level 44a, a second level 44b which is extended from the first level 44a, a third level 44c which is extended from the second level 44b, and a fourth level 44d which is extended from the third level 44c. Each level has a height of six inches. The telescopic arm 44 is located inside said seat base 22a. The seat member 42 may be mounted on top of the fourth level 44d. The telescopic arm 44 allows the seat to be lifted a minimum if one level and a maximum of four levels, meaning that the seat member 42 is capable of being lifted a minimum of 6 inches from the seat base 22a and a maximum of twenty-four inches from the base portion 22a. The lifting mechanism 46 is connected to said telescopic arm 44. The lifting mechanism 46 is responsible for extending or compacting the telescopic arm 44. The lifting mechanism 46 may use a hydraulic system, a pneumatic system, or the like to actuate the telescopic arm 46. The lifting mechanism 46 is located inside the motorized grocery cart 22. The activation button 48 is located on the seat member 42. In a suitable embodiment said activation button 48 is located on the base portion 42a. Said activation button 48 may be a pushbutton switch, a toggle switch, a selector switch, or any variation thereof. The activation button 48 is configured to activate the lifting mechanism 46 for lifting or lower the seat member 42.

The fastener assembly 60 includes a seat harness 62. Said seat harness mounted on the back portion 42b. Seat harness 62 may be made of cloth, nylon, plastic, or any variation thereof. The seat harness 62 is configured to receive and secure a user. When the seat member 42 is being lifted or lowered there may exist a risk that the user may fall from the seat. The seat harness 62 is used to minimize the risk of a user falling from the seat member 42 when the telescopic arm 44 is actuated.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A motorized grocery store scooter with seat lifting mechanism, comprising:
   a) a motorized cart assembly including a motorized grocery cart, and a grocery basket;
   b) a seat assembly including a seat member, a telescopic arm, an activation button, and a lifting mechanism, said seat member is mounted on top of the telescopic arm, the lifting mechanism is capable of extending or contracting the telescopic arm, the actuation button activates the lifting mechanism, the telescopic arm has four levels, each level lift the seat member six inches, the telescopic arm is configured to be extended at a maximum length of twenty-four inches; and
   c) a fastening assembly including a seat harness, the seat harness is mounted on said seat member, the seat harness is configured to secure a user when the seat member is being extended or contracted.

2. The motorized grocery store scooter with seat lifting mechanism of claim 1, wherein said motorized cart assembly includes a steering wheel.

3. The motorized grocery store scooter with seat lifting mechanism of claim 1, wherein said motorized grocery cart further includes a front portion that receives the grocery basket.

4. The motorized grocery store scooter with seat lifting mechanism of claim 1, wherein said motorized grocery cart further includes a seat base.

5. The motorized grocery store scooter with seat lifting mechanism of claim 1, wherein said seat member includes a back portion and a base portion.

6. The motorized grocery store scooter with seat lifting mechanism of claim 5, wherein said activation button is located on the base portion.

7. The motorized grocery store scooter with seat lifting mechanism of claim 1, wherein said telescopic arm includes a first level, a second level, a third level, and a fourth level.

8. The motorized grocery store scooter with seat lifting mechanism of claim 7, wherein said first level has a height of six inches, said second level has a height of six inches, said third level has a height of six inches, and said fourth level has a height of six inches.

9. The motorized grocery store scooter with seat lifting mechanism of claim 4, wherein said telescopic arm is located in said seat base.

10. The motorized grocery store scooter with seat lifting mechanism of claim 5, wherein said seat harness is mounted on the back portion.

11. A motorized grocery store scooter with seat lifting mechanism, comprising:
    a) a motorized cart assembly including a motorized grocery cart, and a grocery basket, the motorized grocery cart further includes a steering wheel, a seat base and a front portion, said grocery basket is located on the front portion;
    b) a seat assembly including a seat member, a telescopic arm, an activation button, and a lifting mechanism, the telescopic arm having a first level, a second level, a third level, and a fourth level, said seat member is mounted on top of the fourth level, the lifting mechanism is connected to the telescopic arm, the lifting mechanism is capable of extend or contract the telescopic arm, the actuation button activates the lifting mechanism, the actuation button is located on a base portion, each level of the telescopic arm has a height of six inches, the telescopic arm is configured to be extended at a maximum length of twenty-four inches, when the telescopic arm is contracted the seat member is in a rest configuration, seat member in rest configuration seats on the seat base; and
    c) a fastening assembly including a seat harness, the seat harness is mounted on a back portion of the seat member, the seat harness is configured to secure a user when the seat member is being extended or contracted.

12. A motorized grocery store scooter with seat lifting mechanism, consisting of:
    a) a motorized cart assembly including a motorized grocery cart, and a grocery basket, the motorized grocery cart further includes a steering wheel, a seat base and a front portion, said grocery basket is located on the front portion;
    b) a seat assembly including a seat member, a telescopic arm, an activation button, and a lifting mechanism, the telescopic arm having a first level, a second level, a third level, and a fourth level, said seat member is mounted on top of the fourth level, the lifting mechanism is connected to the telescopic arm, the lifting mechanism is capable of extend or contract the telescopic arm, the lifting mechanism uses a hydraulic system, the actuation button activates the lifting mechanism, the actuation button is located on a base portion of the seat member, each level of the telescopic arm has a height of six inches, the telescopic arm is configured to be extended at a maximum length of twenty-four inches, when the telescopic arm is contracted the seat member is in a rest configuration, seat member in rest configuration seats on the seat base; and c) a fastening assembly including a seat harness, the seat harness is mounted on a back portion of the seat member, the seat harness is configured to secure a user when the seat member is being extended or contracted.

* * * * *